United States Patent
Watanabe et al.

(10) Patent No.: US 6,682,856 B1
(45) Date of Patent: Jan. 27, 2004

(54) SECONDARY BATTERY HAVING A NON-AQUEOUS ELECTROLYTE

(75) Inventors: Shoichiro Watanabe, Ikoma-gun (JP); Kazuya Iwamoto, Sakai (JP); Atsushi Ueda, Osaka (JP); Jun Nunome, Yawata (JP); Hizuru Koshina, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 126 days.

(21) Appl. No.: 09/959,099

(22) PCT Filed: Jun. 29, 2000

(86) PCT No.: PCT/JP00/04292

§ 371 (c)(1), (2), (4) Date: Oct. 18, 2001

(87) PCT Pub. No.: WO01/03227

PCT Pub. Date: Jan. 11, 2001

(30) Foreign Application Priority Data

Jun. 30, 1999 (JP) .......................................... 11-184930

(51) Int. Cl.$^7$ ................................................. H01M 6/16
(52) U.S. Cl. ........................ 429/326; 429/324; 429/325; 429/333
(58) Field of Search ................................. 429/324, 325, 429/326, 333

(56) References Cited

FOREIGN PATENT DOCUMENTS

| JP | 03-8270 | * | 1/1991 | .......... H01M/10/40 |
|---|---|---|---|---|
| JP | 3008270 | | 1/1991 | |
| JP | 4337258 | | 11/1992 | |
| JP | 04-337258 | * | 11/1992 | .......... H01M/10/40 |
| JP | 05-47416 | * | 2/1993 | .......... H01M/10/40 |
| JP | 5047416 | | 2/1993 | |
| JP | 6203873 | | 7/1994 | |
| JP | 06-203873 | * | 7/1994 | .......... H01M/10/40 |
| JP | 07-50175 | * | 2/1995 | .......... H01M/10/40 |
| JP | 7050175 | | 2/1995 | |
| JP | 8138741 | | 5/1996 | |
| JP | 08-138741 | * | 5/1996 | .......... H01M/10/40 |
| JP | 10-74537 | * | 3/1998 | .......... H01M/10/40 |
| JP | 10074537 | | 3/1998 | |
| JP | 10284120 | | 10/1998 | |
| JP | 10-284120 | * | 10/1998 | .......... H01M/10/40 |

OTHER PUBLICATIONS

International Search Report dated Sep. 19, 2000.
International Preliminary Examination Report.

* cited by examiner

Primary Examiner—Patrick Ryan
Assistant Examiner—Dah-Wei Yuan
(74) Attorney, Agent, or Firm—Stevens, Davis, Miller & Mosher, LLP

(57) ABSTRACT

A non-aqueous electrolyte secondary battery which comprises a positive electrode containing a lithium-containing oxide; a negative electrode containing a material capable of absorbing and releasing lithium; and a non-aqueous electrolyte containing a non-aqueous solvent containing at least one non-cyclic ester and which is excellent in storage stability at high temperatures is provided by adding an oxidation resistance improving agent such as triphenylmethane, tetraphehylmethane or the like.

6 Claims, 1 Drawing Sheet

SECONDARY BATTERY HAVING A NON-AQUEOUS ELECTROLYTE

TECHNICAL FIELD

The present invention relates to a secondary battery using a non-aqueous electrolyte.

BACKGROUND ART

Recently, AV devices and electronic devices such as personal computers of portable or cordless type have been rapidly developed, and demand for secondary batteries which are small in size, light in weight and high in energy density is great as electric sources for driving these devices. Among them, non-aqueous electrolyte batteries using lithium as negative electrode active materials are expected much as batteries having high voltage and high energy density.

In the above batteries, lithium-containing metal oxides which show a voltage on the order of 4 V for lithium, such as $LiCoO_2$, $LiNiO_2$ and $LiMn_2O_4$, are used as positive electrode active materials, and carbon materials and the like which can intercalate or deintercalate lithium are used for negative electrodes.

As electrolytes of these non-aqueous electrolyte batteries, there are used non-aqueous solvents, for example, cyclic esters such as ethylene carbonate and propylene carbonate, cyclic ethers such as tetrahydrofuran, non-cyclic ethers such as dimethoxyethane, and non-aqueous esters such as dimethyl carbonate and methyl propionate, and mixed solvents thereof. Among them, non-cyclic esters are often used because they can provide electrolytes of low viscosity and high conductivity.

At present, the above batteries have a wide variety of uses for not only portable type information terminals (such as portable telephones and notebook type personal computers), but also electric cars and power storage, and use environments therefor become increasingly severer. Especially, considering the use as electric sources for electric cars, batteries are exposed to high-temperature environment of higher than 80° C. in summer, and batteries having high reliability even at such severe environmental temperatures are desired.

DISCLOSURE OF INVENTION

In these secondary batteries, non-aqueous organic solvents which do not undergo electrolysis even at high voltages are used in an attempt to provide batteries having high reliability. However, deterioration of discharge characteristics is caused in the environment of high temperatures, and, in the worst case, leakage of electrolyte may occur.

As a result of investigation conducted by the inventors for the purpose of providing excellent batteries having high reliability even when they are stored at high temperatures, they have found an interesting phenomenon on behavior of oxidative decomposition of electrolyte. That is, an oxidative decomposition of electrolyte takes place on the surface of lithium-containing metal oxide which is a positive electrode active material in the environment of high temperatures, but the decomposition product is usually a low molecular compound and is released out of the electrolyte system as a gas or dissolves in the electrolyte. Therefore, it has been found that even if the oxidative decomposition of electrolyte occurs, the active points of the positive electrode active material are not poisoned and keep high activity, and, hence, the oxidative decomposition reaction of the electrolyte continuously proceeds to result in exhaustion of the electrolyte, increase of internal pressure due to evolution of a decomposition gas in a large amount, and leakage of the electrolyte.

It has been found that especially when non-cyclic esters such as dimethyl carbonate, diethyl carbonate and ethylmethyl carbonate are used as non-aqueous solvents of electrolyte, an ester interchange reaction proceeds in an environment of high temperatures to produce methoxy group ($CH_3O$—) or ethoxy group ($CH_3CH_2O$—) in the course of the reaction, which attacks active points of the positive electrode as a nucleophilic reagent to cause further progress of the decomposition reaction of the electrolyte.

The present invention which is based on the new knowledge on the behavior of oxidative decomposition of electrolyte relates to a non-aqueous electrolyte secondary battery using a lithium-containing oxide as a positive electrode active material, a material capable of absorbing and releasing lithium as a material of negative electrode, and a non-aqueous solvent containing at least one non-cyclic ester as a non-aqueous electrolyte, characterized in that an oxidation resistance improving agent is added to the non-aqueous electrolyte, and, thus, increase of internal pressure or leakage of electrolyte can be effectively inhibited by improving the oxidation resistance of the electrolyte.

BEST MODE FOR CARRYING OUT THE INVENTION

Figure 1:
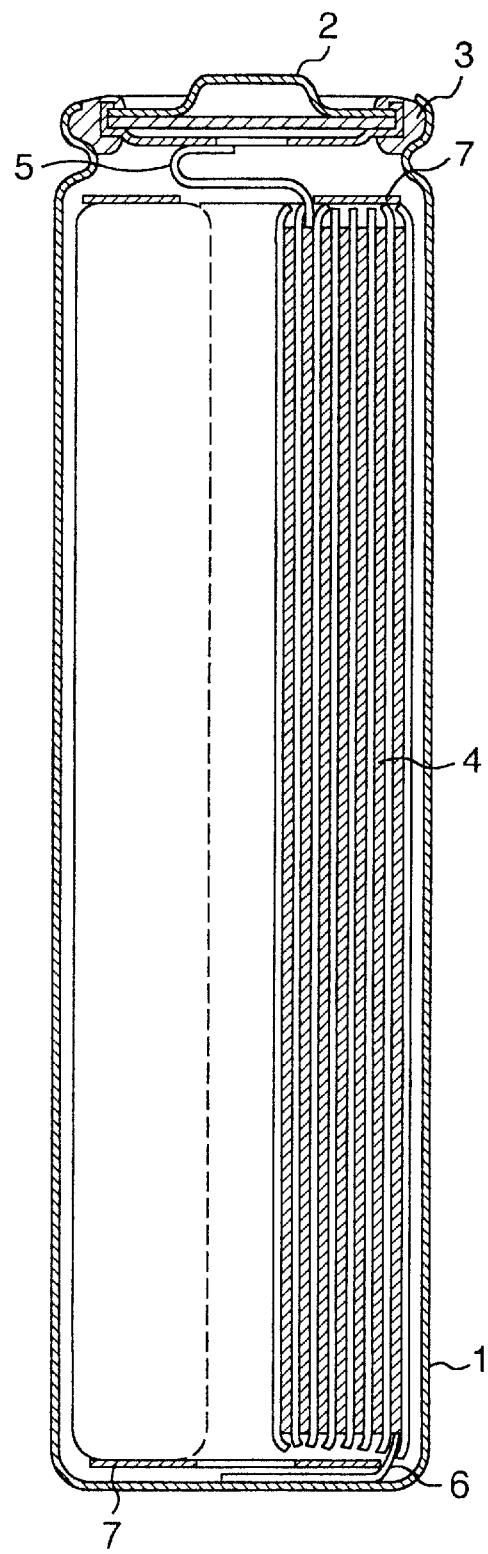
FIG. 1 is a longitudinal sectional view of a cylindrical battery in the example of the present invention and the comparative example.

The present invention is based on the above new knowledge on the behavior of oxidative decomposition of electrolyte and it relates to a non-aqueous electrolyte secondary battery using a lithium-containing oxide as a positive electrode active material, a material capable of absorbing and releasing lithium as a material of negative electrode, and a non-aqueous solvent containing at least one non-cyclic ester as a non-aqueous electrolyte, characterized in that an oxidation resistance improving agent is added to the non-aqueous electrolyte.

Here, the oxidation resistance improving agents are those which improve oxidation resistance of non-aqueous electrolyte, especially, electrolyte containing non-cyclic esters, and they react selectively with methoxy group or ethoxy group produced by ester interchange reaction of non-cyclic esters to consume the methoxy group or the ethoxy group, thereby to inhibit the decomposition reaction of the electrolyte. Specifically, a standard electrolyte is prepared by adding $LiPF_6$ in an amount of 1 mol/liter to a solvent comprising a mixture of ethylene carbonate, diethyl carbonate and methyl propionate at a volumetric ratio of 30:50:20. The electrolyte is subjected to a cyclic voltammetry using a platinum electrode as a working electrode, and lithium metal as a reference electrode and a counter electrode at a high temperature of 80° C. before and after addition of 3% by weight of the oxidation resistance improving agent. By the cyclic voltammetry, a comparison is made on the voltage under which an oxidation electric current produced by the decomposition of the electrolyte reaches 10 $\mu Acm^{-2}$, and judgement can be conducted on the basis of whether the voltage is higher after the addition than before the addition.

As preferred oxidation resistance improving agents, mention may be made of aryl-substituted alkyl compounds having 3 or more, preferably 3–8, more preferably 3–5 aryl groups substituted in their basic skeleton of aliphatic hydrocarbons.

The aryl groups selectively react with methoxy group or ethoxy group produced by the ester interchange reaction of the cyclic esters to consume the methoxy group or the ethoxy group, thereby significantly inhibiting the decomposition reaction of the electrolyte.

Here, the aryl group means a group containing one or more aromatic rings or composed of one or more aromatic rings. The aromatic rings may be heterocyclic rings containing a hetero-atom selected from S, N, O and P, and, furthermore, may be pseudoaromatic rings. The term "pseudoaromatic" means groups which are not aromatic in an accurate sense, but behave in the same manner as aromatic rings due to non-localization of electrons, such as furan, thiophene and pyrrole.

Examples of the aromatic rings are benzene, biphenyl, naphthalene, 1-benzylnaphthalene, anthracene, dihydroanthracene, pyridine, 4-phenylpyridine, 3-phenylpyridine, thiophene, benzothiophene, furan, pyran, isobenzofuran, chromene, pyrrole, imidazole, pyrazole, pyrimidine, indole, indolizine, isoindole, quinoline, isoquinoline, quinoxaline, carbazole, and the like.

The aryl group may be substituted with a halogen atom, an alkyl group of 1–5 carbon atoms, an alkoxy group of 1–5 carbon atoms, and the like, and substitution position of these substituents is not particularly limited.

The aryl group is preferably a substituted or unsubstituted phenyl group, more preferably an unsubstituted phenyl group.

The aliphatic hydrocarbon which is a basic skeleton is a straight chain or branched chain alkyl compound of preferably 1–20 carbon atoms, more preferably 1–10 carbon atoms and further preferably 1–5 carbon atoms.

More preferred oxidation resistance improving agents are those which are represented by the following formula (1):

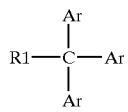

(1)

(wherein Ar is an aryl group; and R1 is a group selected from the group consisting of hydrogen atom, aryl groups and lower alkyl groups).

In the above formula, definition of the aryl group is as mentioned above.

In the above formula, the lower alkyl group is a straight chain or branched chain alkyl group of 1–10 carbon atoms or a straight chain or branched chain cycloalkyl group of 3–10 carbon atoms, and the straight chain or branched chain alkyl group is preferred. The carbon number of the lower alkyl group is preferably 1–5, more preferably 1–3.

The lower alkyl group may be substituted with an aryl group, a halogen atom, an alkoxy group of 1–5 carbon atoms, and the like, and the substitution position of the substituents is not particularly limited. The substituent is more preferably an aryl group, and definition of the aryl group is as mentioned above.

The preferred compounds represented by the formula (1) include substituted or unsubstituted triphenylmethane, triphenylethane, triphenylpropane, triphenylbutane, triphenylpentane, tetraphenylmethane, tetraphenylethane, tetraphenylpropane, tetraphenylbutane, tetraphenylpentane, pentaphenylethane, pentaphenylpropane, pentaphenylbutane, pentaphenylpentane, and the like. The substitution position of the phenyl group is not particularly limited. Among them, especially preferred are unsubstituted triphenylmethane and tetrapheylmethane.

The oxidation resistance improving agents are preferably added in an amount of 0.1–20% by weight based on the total weight of the non-aqueous electrolyte, whereby oxidative decomposition resistance of the electrolyte is improved, and excellent batteries having high reliability even when they are stored at high temperatures can be provided.

More preferred lithium-containing transition metal oxides used as positive electrode active materials in the present invention include $Li_xCoO_2$, $Li_x$, $NiO_2$ (U.S. Pat. No. 4302518), $Li_xMnO_2$, $Li_xCo_yNi_{1-y}O_2$ (JP-A-63-299056), $Li_xCo_fV_{1-y}O_z$, $Li_xNi_{1-y}M_yO_2$ (M=Ti, V, Mn, Fe), $Li_x$-$Co_aNi_bM_cO_2$ (M=Ti, Mn, Al, Mg, Fe, Zr), $Li_xMn_2O_4$, $Li_xMn_{2-y}M_yO_4$ (M=Na, Mg, Sc, Y, Fe, Co, Ni, Ti, Zr, Cu, Zn, Al, Pb, Sb) (where x=0–1.2, y=0–0.9, f=0.9–0.98, z=2.0–2.3, a+b+c=1, $0 \leq a \leq 1$, $0 \leq b \leq 1$, $0 \leq c \leq 1$). The value x is a value before starting of charging and discharging, which increases or decreases by charging and discharging.

The lithium-containing transition metal oxides used as positive electrode active materials in the present invention can be prepared by mixing a carbonate, nitrate, oxide or hydroxide of lithium with a carbonate, nitrate, oxide or hydroxide of a transition metal such as cobalt, manganese or nickel at a desired composition, grinding the mixture and firing the powder or by a solution reaction. The firing method is especially preferred, and the firing temperature can be 250–1500° C. at which a part of the mixed compound is decomposed and molten. The firing time is preferably 1–80 hours. The firing gas atmosphere can be any of air atmosphere, oxidizing atmosphere or reducing atmosphere, and has no special limitation.

In the present invention, a plurality of different positive electrode active materials may be used in combination. For example, those which are opposite in behavior of expansion and contraction at the time of charging and discharging can be used. Preferred examples of positive electrode active materials which expand at the time of discharging (at the time of intercalation of lithium ion) and contract at the time of charging (at the time of deintercalation of lithium ion) are spinel type lithium-containing manganese oxides, and preferred examples of positive electrode active materials which contract at the time of discharging (at the time of intercalation of lithium ion) and expand at the time of charging (at the time of deintercalation of lithium ion) are lithium-containing cobalt oxides. Preferred structural formula of the spinel type lithium-containing manganese oxides is $Li_{1-x}Mn_2O_4$ ($0 \leq x \leq 1$) and preferred examples of the lithium-containing cobalt oxides are $Li_{1-x}CoO_2$ ($0 \leq x \leq 1$)

Conducting agents in the positive electrode active materials of the present invention can be any electron conducting materials as far as they do not undergo chemical changes in the constructed batteries. For example, there may be used graphite such as natural graphite (flake graphite, etc.) and artificial graphite, carbon blacks such as acetylene black, ketjen black, channel black, furnace black, lamp black and thermal black, conductive fibers such as carbon fibers and metal fibers, metal powders such as carbon fluoride, copper, nickel, aluminum and silver, conductive whiskers such as zinc oxide and potassium titanate, conductive metal oxides such as titanium oxide, and organic conductive materials such as polyphenylene derivatives. These can be used each alone or in admixture. Of these conducting agents, especially preferred are artificial graphite, acetylene black and nickel powder. Amount of the conducting agents is not especially limited, but is preferably 1–50% by weight, more preferably 1–30% by weight. In the case of carbon or graphite, 2–15% by weight is especially preferred.

Preferred binders in the positive electrode mix in the present invention are polymers having a decomposition temperature of not lower than 300° C. Examples of the binders are polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluorethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychloro-trifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethylvinyl ether-tetrafluoroethylene copolymer. Of these binders, the most preferred are polyvinylidene fluoride (PVDF) and polytetrafluoroethylene (PTFE).

As collectors of positive electrodes, there may be used any electron conductors as far as they do not undergo chemical changes in the constructed batteries. For examples, as materials of the collectors, there may be used stainless steel, nickel, aluminum, titanium and carbon, and, besides, aluminum and stainless steel the surface of which is treated with carbon, nickel, titanium or silver. Aluminum or aluminum alloys are especially preferred. The surface of these materials may be oxidized. Moreover, the surface of the collectors may be made rough by a surface treatment. As for the shape of the collectors, they may be in the form of foil, film, sheet, net, punched material, lath, and molded articles of porous body, foamed body, fiber group, nonwoven fabrics, and the like. Thickness thereof is not particularly limited, and those of 1–500 $\mu$m are used.

The negative electrode materials used in the present invention may be lithium, lithium alloys, and compounds capable of absorbing and releasing lithium ions, such as alloys, intermetallic compounds, carbons, organic compounds, inorganic compounds, metal complexes and organic high molecular compounds. These may be used each alone or in combination.

As the lithium alloys, mention may be made of Li—Al (U.S. Pat. No. 4002492), Li—Al—Mn, Li—Al—Mg, Li—Al—Sn, Li—Al—In, Li—Al—Cd, Li—Al—Te, Li—Ga (JP-A-60-257072), Li—Cd, Li—In, Li—Pb, Li—Bi, Li—Mg, and the like. The lithium content is preferably not less than 10%.

The alloys and the intermetallic compounds include compounds of transition metals and silicon, compounds of transition metals and tin, and the like. Compounds of nickel and silicon are especially preferred.

Examples of the carbonaceous materials are cokes, pyrolytic carbons, natural graphite, artificial graphite, mesocarbon microbeads, graphitized mesophase spherules, vapor deposited carbons, glassy carbons, carbon fibers (polyacrylonitrile fibers, pitch fibers, cellulose fibers and vapor deposited carbon fibers), amorphous carbons, and carbons prepared by firing organic materials. These may be used each alone or in combination. Among them, preferred are graphite materials such as those obtained by graphitizing mesophase spherules, natural graphite and artificial graphite. The carbonaceous materials may contain different compounds such as O, B, P, N, S, SiC and $B_4C$ in addition to carbon. The content is preferably 0–10% by weight.

The inorganic compounds include, for example, tin compounds and silicon compounds, and inorganic oxides include, for example, titanium oxides, tungsten oxides, molybdenum oxides, niobium oxides, vanadium oxides and iron oxides. Furthermore, inorganic chalcogenides include, for example, iron sulfide, molybdenum sulfide and titanium sulfide. As the organic high molecular compounds, there may be used polythiophene, polyacetylene, and the like, and as nitrides, there may be used cobalt nitrides, copper nitrides, nickel nitrides, iron nitrides, manganese nitrides, and the like.

These negative electrode materials may also be used as composites, and, for example, there may be considered combinations of carbon and alloy, carbon and inorganic compound, and the like.

Average particle size of the carbon materials used in the present invention is preferably 0.1–60 $\mu$m, more preferably 0.5–30 $\mu$m. Specific surface area is preferably 1–10 m$^2$/g. Furthermore, from the point of crystal structure, a graphite which has a carbon hexagonal plane spacing (d0002) of 3.35–3.40 Å and a size of crystallites in the direction of axis c (LC) of not less than 100 Å is preferred.

In the present invention, since Li is contained in the positive electrode active material, a negative electrode material containing no Li (such as carbon) can be used. Moreover, when Li is added to the negative electrode material containing no Li in a small amount (about 0.01–10 parts by weight based on 100 parts by weight of the negative electrode material), even if a part of Li becomes inactive owing to the reaction of Li with electrolyte, Li can be supplemented with Li contained in the negative electrode material and this is preferred. Li can be contained in the negative electrode material, for example, in the following manner. That is, lithium metal which is molten by heating is coated on a collector to which a negative electrode material is pressed, thereby impregnating the negative electrode material with Li, or lithium metal is previously applied to electrode group by press bonding and Li is electrochemically doped in the negative electrode material in the electrolyte.

The conducting agents in the negative electrode mix can be any electron conducting materials which do not undergo chemical changes in the constructed batteries like the conducting agents in the positive electrode mix. Furthermore, in the case of using carbonaceous materials as the negative electrode materials, the carbonaceous materials per se have electron conductivity and, hence, the conducting agents may be or may not be contained.

The binders in the negative electrode mix may be either thermoplastic resins or thermosetting resins, and preferred are polymers having a decomposition temperature of not lower than 300° C. Examples of the binders are polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethyl-ene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethylvinyl ether-tetrafluoroethylene copolymer. More preferred are styrene-butadiene rubber and polyvinylidene fluoride. Of these binders, styrene-butadiene rubber is most preferred.

As collectors of negative electrodes, there may be used any electron conductors as far as they do not undergo chemical changes in the constructed batteries. For examples, as materials of the collectors, there may be used stainless steel, nickel, copper, titanium: and carbon, and, besides, copper and stainless steel the surface of which is treated with carbon, nickel, titanium or silver, and, further, Al—Cd alloys. Copper or copper alloys are especially preferred. The surface of these materials may be oxidized. Moreover, the surface of the collectors may be made rough by a surface treatment. As for the shape of the collectors, they may be in the form of foil, film, sheet, net, punched material, lath and molded articles of porous body, foamed body, fiber group, nonwoven fabrics, and the like. Thickness is not particularly limited, and those of. 1–500 μm are used.

The electrode mixes can contain various additives such as fillers, dispersing agents, ion conducting agents, pressure-increasing agents and others in addition to the conducting agents and the binders. The fillers can be any fibrous materials which do not undergo chemical changes in the constructed batteries. Generally, olefinic polymers such as polypropylene and polyethylene and fibers such as glass fibers and carbon fibers are used. Amount of the fillers is not especially limited, but is preferably 0–30% by weight.

In addition to the mix layer containing positive electrode active material or negative electrode material, the positive electrode and the negative electrode used in the present invention may further have an undercoat layer introduced for the purpose of improving adhesion between the collector and the mix layer, conductivity, cycle characteristics and charge and discharge efficiency or a protective layer introduced for the purpose of mechanical protection or chemical protection of the mix layer. This undercoat layer or protective layer can contain binders, particles of conducting agent, particles having no conductivity, and the like.

The non-aqueous electrolyte in the present invention comprises a non-aqueous solvent containing at least one non-cyclic ester and a lithium salt soluble in the solvent.

As the non-cyclic esters, mention may be made of non-cyclic carbonates such as dimethyl carbonate (DMC), diethyl carbonate (DEC), ethylmethyl carbonate (EMC), and dipropyl carbonate (DPC) and aliphatic carboxylic acid esters such as methyl formate, methyl acetate, methyl propionate and ethyl propionate. Among them, preferred are non-cyclic carbonates such as dimethyl carbonate, diethyl carbonate and ethylmethyl carbonate.

The non-aqueous solvents may further contain cyclic carbonates such as ethylene carbonate (EC), propylene carbonate (PC), butylene carbonate (BC) and vinylene carbonate (VC), γ-lactones such as γ-butyrolactone, non-cyclic ethers such as 1,2-dimethoxyethane (DME), 1,2-diethoxyethane (DEE) and ethoxymethoxyethane (EME), cyclic ethers such as tetrahydrofuran and 2-methyltetrahydrofuran, and non-protonic organic solvents such as dimethyl sulfoxide, 1,3-dioxolan, formamide, acetamide, dimethylformamide, dioxolan, acetonitrile, propylnitrile, nitromethane, ethyl monoglyme, phosphoric acid triester, trimethoxymethane, dioxolan derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide, and N-methylpyrrolidone. One or more of them may be used in admixture. Among them, it is preferred to use a mixed system of cyclic carbonate and non-cyclic carbonate or a mixed system of cyclic carbonate, non-cyclic carbonate and aliphatic carboxylic acid ester as a main component.

The lithium salts which dissolve in these solvents include, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2LiAsF_6$, LiN $(CF_3SO_2)_2$, $LiB_{10}Cl_{10}$ (JP-A-57-74974), lithium salts of lower aliphatic carboxylic acids (JP-A-60-41733), LiCl, LiBr, LiI (JP-A-60-247265), chloroborane lithium (JP-A-61-165957), lithium tetraphenylborate (JP-A-61- 214376), and the like. These may be contained each alone or in combination of two or more in the electrolyte and the like. Among them, it is especially preferred to contain $LiPF_6$.

Especially preferable electrolyte in the presentiinvention is one which contains at least ethylene carbonate and ethylmethyl carbonate and $LiPF_6$ as a lithium salt. Amount of the electrolyte contained in the battery is not limited, and it can be used in a necessary amount depending on the amount of positive electrode active material and that of negative electrode material and the size of the battery. Amount of the lithium salt dissolved in the non-aqueous solvent is not particularly limited, but is preferably 0.2–2 mol/l, especially preferably 0.5–1.5 mol/l.

Moreover, for the purpose of obtaining superior charge and discharge characteristics, organic additives such as 2-methylfuran, thiophene (JP-A-61-161673), pyrrole (JP-A-3-59963), aniline (JP-A-60-79677), crown ether, pyridine, triethyl phosphite, triethanolamine, cyclic ethers, ethylenediamine, n-glyme, hexaphosphoric acid triamide, nitrobenzene derivatives, and nitrogen-containing aromatic heterocyclic compounds (JP-A-9-204932) may be dissolved in the electrolyte. The electrolyte is used generally by impregnating or filling a separator such as a porous polymer, a glass filter or a nonwoven fabric with the electrolyte.

Furthermore, in order to make the electrolyte nonflammable, halogen-containing solvents such as carbon tetrachloride and ethylene trifluoride chloride can be contained in the electrolyte. Moreover, carbon dioxide can be contained in the electrolyte for giving suitability for high-temperature storage.

Moreover, there may be used a gel electrolyte comprising an organic solid electrolyte which contains the above non-aqueous electrolyte. As the organic solid electrolyte, effective are polymeric matrix materials such as polyethylene oxide, polypropylene oxide, polyphosphazene, polyaziridine, polyethylene sulfide, polyvinyl alcohol, polyvinylidene fluoride and polyhexafluoropropylene, and derivatives, mixtures and composites thereof. Especially preferred are copolymers of vinylidene fluoride and hexafluoropropylene and mixtures of polyvinylidene fluoride and polyethylene oxide.

As the separator, an insulating microporous thin film having a high ion permeability and a desired mechanical strength is used. The separator preferably has a function of closing the pores at a temperature higher than 80° C. to enhance the resistance. Sheets or nonwoven fabrics made from olefin polymers comprising one or combination of polypropylene and polyethylene or glass fibers are used from the points of organic solvent resistance and hydrophobic properties. Pore diameter of the separator is preferably such that active materials, binders and conducting agents which are released from the electrode sheets do not permeate through the pores, and the pore diameter is preferably 0.01–1 μm. Thickness of the separator is generally 10–300 μm. The porosity is determined depending on permeability to electron or ion, kind of materials or film thickness, and is generally 30–80%.

Shape of batteries can be any of coin type, button type, sheet type, cylinder type, flat type and rectangular type. When the shape of batteries is coin type or button type, the mix of positive electrode active material or negative electrode material is used mainly by compressing into a shape of pellet. Thickness and diameter of the pellet are determined depending on the size of batteries. When the shape of batteries is sheet type, cylinder type or rectangular type, the mix of positive electrode active material or negative electrode material is used mainly by coating on a collector, then drying and compressing the collector. For coating, general coating methods can be employed. For example, there may be employed reverseroll coating method, direct roll coating method, blade coating method, knife coating method, extrusion coating method, curtain coating method, gravure coating method, bar coating method, casting method, dip coating method, and squeeze coating method. Among them, blade coating method, knife coating method and extrusion coating method are preferred. The coating is preferably carried out at a speed of 0.1–100 m/min. In this case, satisfactory surface state of the coat layer can be obtained by selecting the coating method in conformity with solution property and drying property of the mix. The coating may be carried out sequentially on each side or simultaneously on both sides. Furthermore, it is preferred to provide the coat layers on both sides of the collector, and the coating layer on one side may comprise a plurality of layers including the mix layer. The mix layer contains a conducting material of binder and the like in addition to materials which participate in intercalation and deintercalation of lithium ions, such as positive electrode active material and negative electrode material. In addition to the mix layer, there may be provided a protective layer containing no active material, an undercoat layer provided on the collector, an intermediate layer provided between the mix layers. It is preferred that these layers which contain no active material contain conductive particles, insulation particles, binder, and the like.

The coating may be continuous coating, intermittent coating or stripe coating. Thickness, length or width of the coat layer are determined depending on the size of battery, and thickness of the coat layer on one side is especially preferably 1–2000 $\mu$m in the compressed state after drying.

For drying or dehydration of pellets or sheets, generally employed methods can be utilized. It is especially preferred to use hot air, vacuum, infrared rays, far infrared rays, electron rays and low-humidity air each alone or in combination. The temperature is preferably in the range of 80–350° C., especially preferably in the range of 100–250° C. Water content is preferably not more than 2000 ppm in the whole battery, and preferably not more than 500 ppm in the positive electrode mix, the negative electrode mix and the electrolyte from the point of cycle characteristics. The pressing method of the sheet can be generally employed methods, and especially preferred are mold pressing method and calender pressing method. The pressing pressure is not particularly limited, but preferably is 0.2–3 t/cm$^2$. The pressing speed of calender pressing method is preferably 0.1–50 m/min.

The pressing temperature is preferably from room temperature to 200° C. Ratio of width of positive electrode sheet to that of negative electrode sheet is preferably 0.9–1.1, especially preferably 0.95–1.0. Ratio of content of the positive electrode active material and the negative electrode material cannot be limited because it varies depending on the kind of compounds and the formulation of the mix, but can be limited to optimum value from the viewpoints of capacity, cycle characteristics and safety.

The shape of the rolled electrodes in the present invention is not necessarily in the form of true cylinder, and may be in the form of ellipsoidal cylinder having a ellipsoidal section or in the form of square pillar such as rectangle.

Preferred combinations in the present invention are combinations of the preferred chemical materials and the preferred parts which construct the batteries as mentioned above. Examples of preferred combinations are as follows. $Li_xCoO_2$, $Li_xNiO_2$, $Li_xMn_2O_4$ ($0 \leq x \leq 1$) are contained as positive electrode active materials, and acetylene black is contained as a conducting agent. The collector of positive electrode is made of stainless steel or aluminum, and is in the form of net, sheet, foil or lath. The negative electrode material preferably does not contain lithium metal alone, but contains at least one compound such as alloy and carbonaceous material. The collector of negative electrode is made of stainless steel and is in the form of net, sheet, foil or lath. Carbon materials such as acetylene black and graphite as electron conducting agent may be contained in the mix used together with positive electrode active materials and negative electrode materials. As the binders, there may be used fluorine-containing thermoplastic compounds such as polyvinylidene fluoride and polytetrafluoroethylene, polymers containing acrylic acid, and elastomers such as styrene-butadiene rubber and ethylene-propylene polymer each alone or in admixture. The electrolyte preferably contains cyclic or non-cyclic carbonates such as ethylene carbonate, diethyl carbonate, dimethyl carbonate and ethylmethyl carbonate or additionally aliphatic carboxylic acid esters such as methyl acetate and methyl propionate, and $LiPF_6$ as a lithium salt. The separator preferably comprises polypropylene or polyethylene each alone or in combination. The battery may have any shapes such as cylindrical shape, flat shape, thin shape and rectangular shape. The battery preferably has a means for ensuring safety against errors in working (e.g., internal pressure releasing type safety valve, current interrupting type safety valve, separator which enhances resistance at high temperatures).

EXAMPLES

Examples of the present invention will be explained below referring to the drawing.

Example 1

FIG. 1 is a longitudinal sectional view of a cylindrical battery used in this example. In FIG. 1, the reference numeral 1 indicates a battery case made by working a stainless steel plate having resistance to organic electrolyte, 2 indicates a sealing plate provided with a safety valve, 3 indicates an insulation packing, 4 indicates an electrode plate group, and a positive electrode and a negative electrode between which a separator is interposed are rolled a plurality of times into a spiral form and inserted in the case 1. A positive electrode lead 5 is drawn from the positive electrode and connected to the sealing plate 2, and a negative electrode lead 6 is drawn from the negative electrode and connected to the bottom of the battery case 1. The reference numeral 7 indicates an insulation ring, which is provided at the upper and lower portions of the electrode plate group 4. The positive electrode, the negative electrode, and others will be explained in detail below.

The positive electrode was made in the following manner. $Li_2CO_3$ and $Co_3O_4$ were mixed and fired at 900° for 10 hours to prepare an $LiCoO_2$ powder. This powder was mixed with 3% of acetylene black and 7% of a fluorocarbon resin binder based on the weight of the $LiCoO_2$ powder, followed by suspending the mixture in an aqueous carboxymethyl cellulose solution to prepare a positive electrode mix paste. The resulting positive electrode mix paste was coated on an aluminum foil of 30 μm in thickness and dried, followed by rolling to make a positive electrode plate of 0.18 mm in thickness, 37 mm in width and 390 mm in length.

For the negative electrode, a mesophase spherule which was graphitized at a high temperature of 2800° C. (hereinafter referred to as "mesophase graphite") was used. This mesophase graphite was mixed with 5% of a styrene-butadiene rubber based on the weight of the mesophase graphite, and then the mixture was suspended in an aqueous carboxymethyl cellulose solution to prepare a paste. This negative electrode mix paste was coated on both sides of a Cu foil of 0.02 mm in thickness and dried, followed by rolling to make a negative electrode plate of 0.20 mm in thickness, 39 mm in width and 420 mm in length.

An aluminum lead was attached to the positive electrode plate and a nickel lead was attached to the negative electrode plate, and the positive electrode plate and the negative electrode plate with a polypropylene separator of 0.025 mm in thickness, 45 mm in width and 950 mm in length interposed between the positive electrode plate and the negative electrode plate were rolled into a spiral form and inserted in a battery case of 17.0 mm in diameter and 50.0 mm in height.

The electrolyte used was one prepared by dissolving 1 mol/liter of $LiPF_6$ in a mixed solvent comprising ethylene carbonate, diethyl carbonate and methyl propionate at a volume ratio of 30:50:20, followed by adding thereto each of triphenylmethane and tetraphenylmethane in an amount of 2% by weight based on the total weight of the electrolyte. The electrolyte was poured into the battery case, and then the case was sealed to make batteries 1 and 2 of the present invention.

Comparative Example

A battery was fabricated in the same manner as in Example 1, except that the electrolyte which did not contain triphenylmethane or tetraphenylmethane was used. This was comparative battery 3.

Then, five cells of the respective batteries 1 and 2 of the present invention and the comparative battery 3 were subjected to constant voltage charging at a limit current of 500 mA and a charging voltage of 4.2 V for a charging time of 2 hours at an environmental temperature of 20° C., and discharge characteristics of these batteries at 1A were examined in charging state. Then, these batteries in charging state were stored in a thermostat chamber at 80° C. for 15 days, and the batteries after stored were also subjected to charging and discharging under the same conditions as above and capacity recovery rate after storage (capacity after storage/capacity before storage×100(%)) was obtained. The results are shown in Table 1.

TABLE 1

| No. | Added organic compound | Recovery rate after stored |
|---|---|---|
| 1 | Triphenylmethane | 90.8 |
| 2 | Tetraphenylmethane | 89.9 |
| 3 | No | 65.2 |

From Table 1, it can be seen that the capacity retention rates after storage of batteries 1 and 2 of the present invention were higher than 85% which was much superior to 65.2% of the battery 3 to which the additives were not added.

As mentioned above, the organic compounds added and shown in Table 1 clearly had the effects. Moreover, an investigation was conducted on the content of the organic compounds to find that the content is preferably not less than 0.1% by weight and not more than 20% by weight. Within this range, preferable effect was exerted on the capacity retention rate of the batteries after stored, and, besides, deterioration of discharge characteristics due to decrease of conductivity of the electrolyte per se can be inhibited.

INDUSTRIAL APPLICABILITY

As explained above, according to the present invention, batteries superior in storage characteristics at high temperatures can be provided by adding an oxidation resistance improving agent to non-aqueous solvent containing at least one ester.

What is claimed is:

1. A non-aqueous electrolyte secondary battery comprising:
   a positive-electrode, the positive electrode comprising a lithium-containing oxide;
   a negative electrode comprising a carbonaceous material and
   a non-aqueous electrolyte comprising a non-aqueous solvent, the non-aqueous solvent comprising at least one non-cyclic ester and an oxidation resistance improving agent, said oxidation resistance improving agent being an aryl-substituted alkyl compound in which 3 or more alkyl groups are substituted with aryl groups.

2. A non-aqueous electrolyte secondary battery according to claim 1, wherein the oxidation resistance improving agent is represented by the formula (1):

(where Ar is an aryl group and R1 is a group selected from the group consisting of hydrogen atom, aryl group and lower alkyl group).

3. A non-aqueous electrolyte secondary battery according to claim 1, wherein the oxidation resistance improving agent is selected from the group consisting of substituted or unsubstituted triphenylmethane, triphenylethane, triphenylpropane, triphenylbutane, triphenylpentane, tetraphenylmethane, tetraphenylethane, tetraphenylpropane, tetraphenylbutane, tetraphenylpentane, pentaphenylethane, pentaphenylpropane, pen taphenylbutane and pentaphenylpentane.

4. A non-aqueous electrolyte secondary battery according to claim 2, wherein the oxidation resistance improving agent is triphenylmethane or tetraphenylmethane.

5. A non-aqueous electrolyte secondary battery according to claim 1, wherein the total amount of the oxidation resistance improving agent in the non-aqueous electrolyte is in the range of 0.1–20% by weight based on the total weight of the electrolyte.

6. A non-aqueous electrolyte secondary battery according to any one of claims 1–5, wherein the non-cyclic ester is at least one compound selected from the group consisting of dimethyl carbonate, diethyl carbonate and ethylmethyl carbonate.

* * * * *